(12) United States Patent
Mahmud

(10) Patent No.: US 8,483,385 B2
(45) Date of Patent: Jul. 9, 2013

(54) NATURAL LANGUAGE DEPENDENT STREAM CIPHERS

(75) Inventor: Maqsood Mahmud, Riyadh (SA)

(73) Assignee: King Saud University, Riyadh (SA)

(*) Notice: Subject to any disclaimer, the term of this patent is extended or adjusted under 35 U.S.C. 154(b) by 957 days.

(21) Appl. No.: 12/407,596

(22) Filed: Mar. 19, 2009

(65) Prior Publication Data
US 2009/0316885 A1 Dec. 24, 2009

Related U.S. Application Data

(60) Provisional application No. 61/074,896, filed on Jun. 23, 2008.

(51) Int. Cl.
*H04L 9/00* (2006.01)

(52) U.S. Cl.
USPC ............ 380/28; 713/189; 713/190; 713/191; 713/192; 713/193

(58) Field of Classification Search
USPC .................................................. 380/28, 263
See application file for complete search history.

(56) References Cited

PUBLICATIONS http://developerapple.com/library/mac/documentation/MacOSX/Conceptual/BPInternational/Articles/Guidelines_for_internationalization (3 pages).
http://www.appliedlanguage.com/free_translation.shtml (2 pages).
http://www.atm.ox.ac.uk/user/iwi/charmap.html (1 page).
Atti et al.; "The Berlekamp-Massey Algorithm revisited"; MSC 2000: 68W30, 15A03; 7 pages.
http://www.bebits.com/app/688 (2 pages).
http://unicode.coerurlumiere.com (192 pages).
Coron, Jean-Sebastien; "Cryptanalysis of a public-key encryption scheme based on the polynomial reconstruction problem"; 7 pages.
http://onlinedictionary.datasegment.com/word/natural (6 pages).
http://www.ectaco.co.uk (4 pages).
http://meltingpot.fortunecity.com/mlk/470/unicode.htm (3 pages).
http://www.i18nguy.com/unicode/language-identifiers.html (9 pages).
http://people.w3.org/rishida/docs/unicode-tutorial (6 pages).
http://people.w3.org/rishida/scripts/arabic (36 pages).
Kahate, Atul; "Cryptography and network security"; Tata McGraw-Hill, 2008; 792 pages.
http://www.cl.cam.ac.uk/~mgk25/unicode.html (57 pages).
L'Ecuyer, P.; "Uniform Random Number Generators"; International Encyclopedia of Statistical Science; Lovric, Miodrag (Ed.); Springer-Verlag, 2010; 1673 pages.
Lenstra, Arjen K.; "Further progress in hashing cryptanalysis"; Lucent Technologies, Bell Laboratories; Feb. 6, 2005; 6 pages.

(Continued)

*Primary Examiner* — Longbit Chai
(74) *Attorney, Agent, or Firm* — Hart IP Law & Strategies

(57) ABSTRACT

A natural language dependent stream cipher is provided to increase complexity of stream cipher encryption. In one aspect, a message is received from a sender as an input in a first natural language and is translated into a selected second natural language. A binary Unicode representation of the input in the second natural language is created. An XOR operation is performed on the binary Unicode representation of the input in the second natural language and a binary key to generate an encrypted output. The encrypted output is sent to a receiver. The encrypted output may be decrypted by the receiver in the reverse of the encryption process. The decryption process yields the original message for viewing by an end-user of the system for a natural language dependent stream cipher.

21 Claims, 4 Drawing Sheets

PUBLICATIONS http://www.myanmars.net/winmyanmar/download.html (2 pages).
http://crl.nmsu.edu/Research/Projects/tipster/ursa (1 page).
http://docs.python.org/library/stdtypes.html (50 pages).
Raina et al.; "Signature analysis with modified linear feedback shift registers (M-LFSRs)"; Fault-Tolerant Computing, 1991; FTCS-21, Digest of Papers; Twenty-First International Symposium, Jun. 25-27, 1991; pp. 88-95 (abstract).
Salomon, David; "Coding for Data and Computer Communications"; Springer, 2005; vol. XVI, 552 pages.
http://unicode.org/consortium/distlist.html (8 pages).
http://unicode.org/notes/tn12/tn12-1.html (10 pages).
Wiener, Michael J.; "The Full Cost of Cryptanalytic Attacks"; 21 pages.
http://www.alanwood.net/unicode/arabic_presentationforms_b.html (7 pages).
http://www.alanwood.net/unicode (7 pages).
Wu et al.; "Cryptanalysis of Stream Cipher COS (2, 128) Mode I"; L. Batten and J. Seberry (Eds.): ACISP 2002, LNCS 2384; Springer-Verlag, Berlin, Heidelberg 2002; pp. 154-158.

NATURAL LANGUAGE DEPENDENT STREAM CIPHERS

This application claims priority to U.S. Provisional Patent Application 61/074,896, filed Jun. 23, 2008, the content of which is herein incorporated by reference in its entirety.

BACKGROUND

A stream cipher is a symmetric key cipher where plain text bits are combined with a pseudorandom cipher bit stream ("key stream"), typically by an exclusive- or ("XOR") operation. In cryptography, a key stream is a stream of random or pseudorandom characters that are combined with a plain text message to produce an encrypted message ("cipher text"). The characters in the key stream can be bits, bytes, numbers, or actual characters like A-Z depending on the usage case. Usually, each character in the key stream is either added, subtracted, or XORed with a character in the plaintext to produce the cipher text using modular arithmetic. The XOR operation is generally defined as a type of logical disjunction on two operands that result in a value of "true" if and only if exactly one of the operands has a value of "true". Stream ciphers are considered to be one of the strongest types of cipher used in cryptography.

In a stream cipher, the plain text digits are encrypted one at a time, and the transformation of successive digits varies during the encryption. In practice, the digits are typically single bits or bytes. Stream ciphers typically execute at a relatively high speed and have relatively low hardware complexity. Stream ciphers, however, can be susceptible to serious security problems if used incorrectly.

SUMMARY

Natural language dependent stream ciphers may include, for example, adding natural language translation complexity to stream ciphers. In one aspect, a natural language dependent stream cipher method includes receiving an input in a first natural language. The input in the first natural language then is translated to an input in a second natural language. A binary Unicode representation of the input in the second natural language is generated. An XOR operation is performed on the binary Unicode representation of the input in the second natural language, and a binary key to generate an encrypted output and the encrypted output is output.

This Summary is provided to introduce a selection of concepts in a simplified form further described below in the detailed description. This Summary is not intended to identify key features or essential features of the claimed subject matter, nor is it intended to be used as an aid in determining the scope of the claimed subject matter.

DETAILED DESCRIPTION

Overview

Natural language, such as languages spoken by humans for general-purpose communication, may be distinguished from constructs such as computer programming languages or the "languages" used in the study of formal logic, especially mathematical logic. In the philosophy of language, the term "ordinary language" sometimes is used as synonymous with natural language, as opposed to mathematical or logical language. Natural languages may include, but are not limited to, for example, English, Arabic, Spanish, French, German, Japanese, Russian, Italian, Greek, etc. Adding a layer of natural language to the process of stream cipher encryption increases the complexity and security of the stream cipher encryption algorithm.

Figure 1:
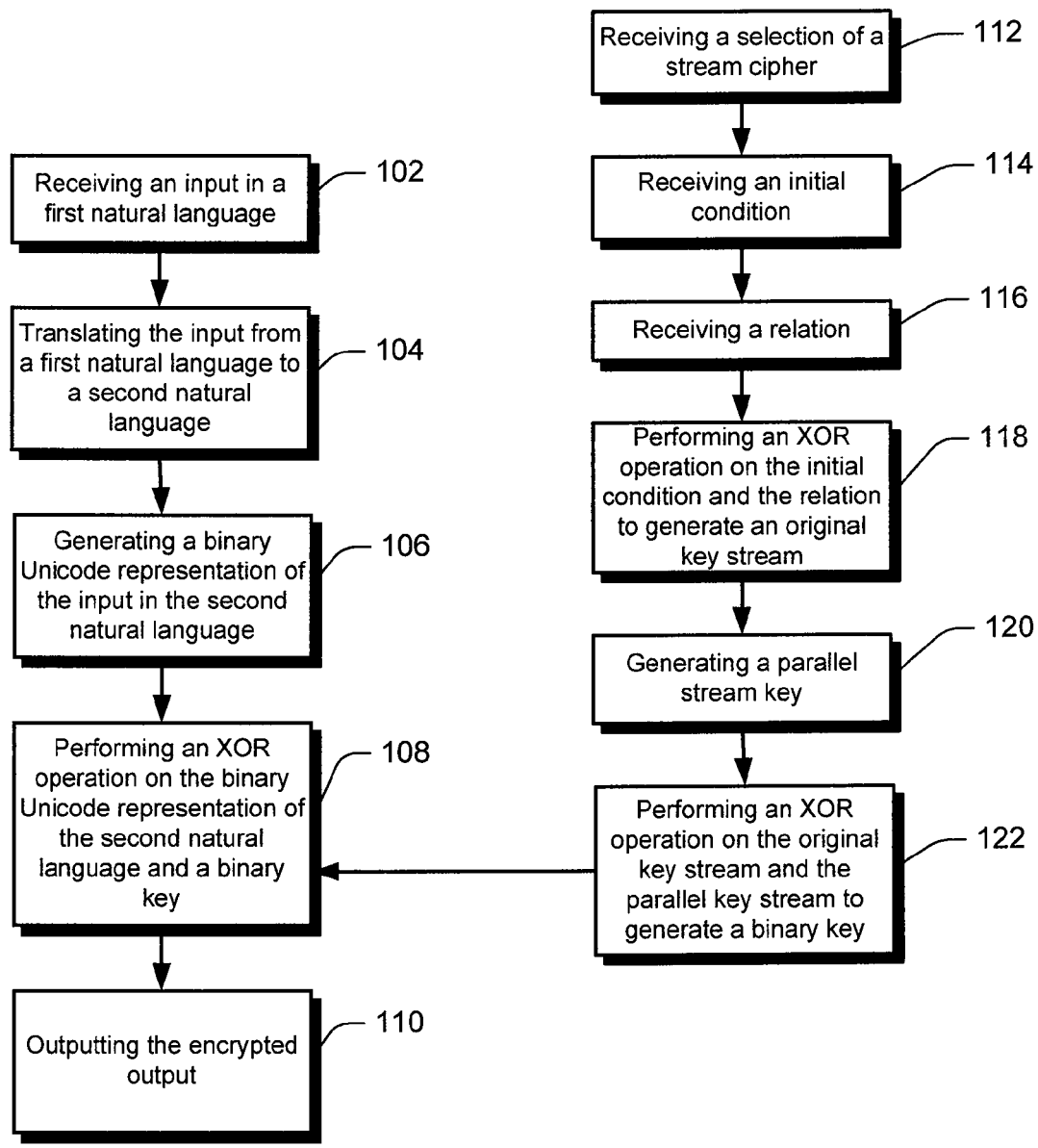
FIG. 1 shows an exemplary method for implementing encryption with natural language dependent stream ciphers, according to one embodiment.

FIG. 1 shows an exemplary method 100 for implementing encryption with natural language dependent stream ciphers, according to one embodiment. A message may be sent from a sender to a receiver using the natural language dependent stream cipher. The message may be received as an input in a first natural language 102. The input in the first natural language may be translated to a second natural language 104. The target language may be selected by the sender or receiver or may be chosen automatically. The translation may be performed manually or by a common translator agreed upon by the sender and the receiver. A binary Unicode representation of the input in the second natural language may be generated 106. An XOR operation may be performed on the binary Unicode representation of the second natural language and a binary key 108 to generate an encrypted output. The encrypted output may be output to the receiver 110.

The binary key may be the binary representation of any word of interest selected by the sender and/or receiver or may be generated by a binary key generating expression. The binary key is created by receiving as input a selection of a desired stream cipher 112, an initial condition 114, and a relation 116. An XOR operation is performed on the initial condition and the relation to generate an original key stream 118. A parallel key stream then may be generated 120. An XOR operation is performed on the original key stream and the parallel key stream to generate the binary key stream 122.

Figure 2:
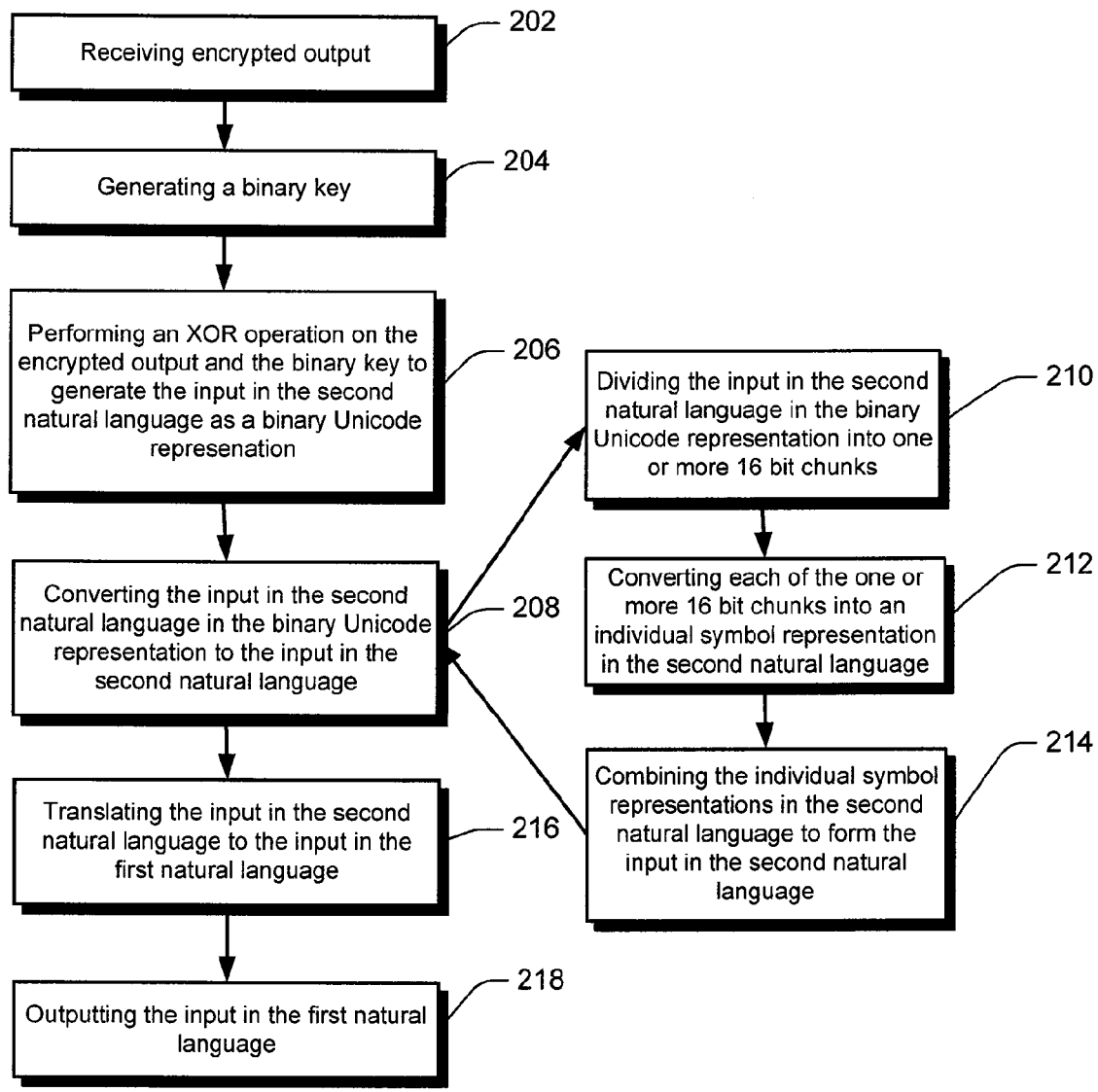
FIG. 2 shows an exemplary method for implementing decryption with natural language dependent stream ciphers, according to one embodiment.

FIG. 2 shows an exemplary method 200 for implementing decryption with natural language dependent stream ciphers, according to one embodiment. After the encrypted message is received from the sender by the receiver 202, it may be decrypted. A binary key may be generated 204 in a manner similar to that for the encryption process. Preferably, the starting conditions are the same as for the encryption process to ensure accurate decryption. The starting conditions may be agreed upon and/or shared by the sender and the receiver prior to passing the encrypted message. An XOR operation may be performed on the encrypted output and the binary key to generate the input in the second natural language as a binary Unicode representation 206. The input in the second natural language as a binary Unicode representation is converted to the input in the second natural language 208. The conversion process may include dividing the input in the second natural language in the binary Unicode representation into one or more 16-bit chunks 210. The one or more 16-bit chunks then are converted to individual symbol representations in the second natural language 212. The individual symbol representations in the second natural language then are combined to form the input in the second natural language 214. The input in the second natural language then is translated to the input in the first natural language 216. The input in the first natural language then is output 218 to the receiver.

The following are descriptions of the individual processes in the use of natural language dependent stream ciphers.

Key Generation

Stream ciphers are selected to encipher data to a selected language. A stream cipher may be a linear feedback shift register (LFSR). A LFSR is a shift register whose input bit is a linear function of its previous state. Alternate stream ciphers may include Alternating Step Generation, Clock Controlled Generation Algorithm, or any other advanced stream cipher with natural language code. The natural language dependent stream cipher code preferably supports the selected language.

Figure 3:
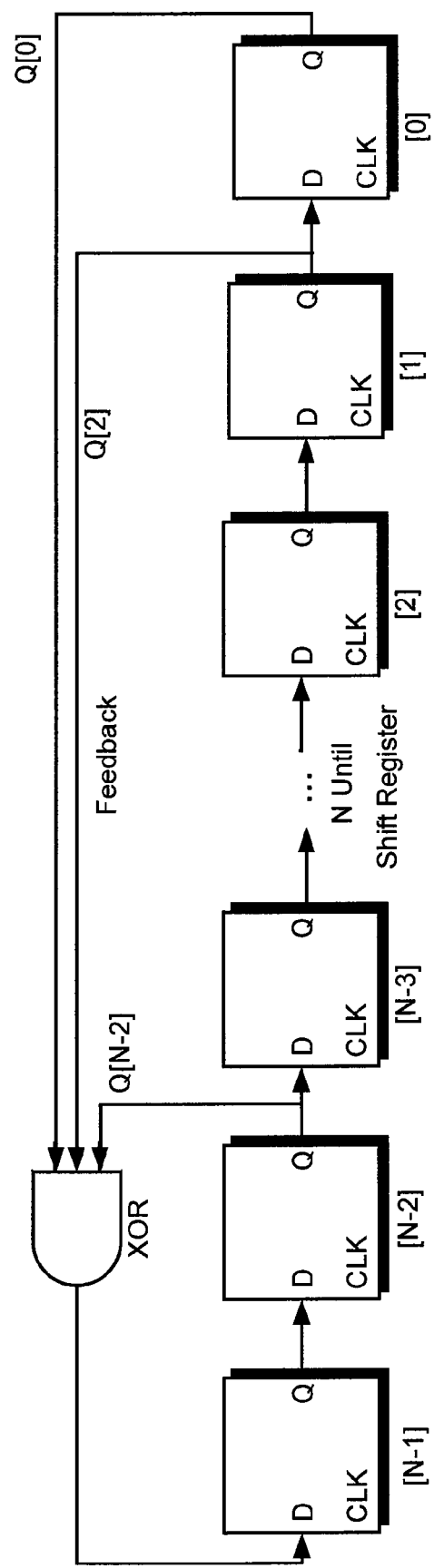
FIG. 3 shows an exemplary linear feedback shift register diagram, according to one embodiment.

A key is generated using the selected stream cipher. In this exemplary embodiment, LSFR is used in the key generation process. FIG. 3 shows a generic LSFR diagram. The key generation method of LFSR is used with a relation (R). The relation may be, for example:

$$R=<n,1+Da+Db+Dc+\ldots+Dn>$$

where $a<b<c<n$, and n is the highest degree of polynomial P(D), and a, b and c are random integers in sequence. Here, $P(D)=1+Da+Db+Dc+\ldots+Dn$ Initial Condition (I.C.) for LFSR=Binary[n]={0/1, 0/1, 0/1 ... n (0/1)}, e.g., for $R=<4, 1+D+D_4>$ Let Initial Condition (I.C.) for LFSR=1010.

A key stream is denoted by K.S or O.K.S. (Original Key Stream). An XOR operation may be performed between D and $D_4$ as shown below to create the O.K.S.

| D | $D_2$ | $D_3$ | $D_4$ | O.K.S. |
|---|---|---|---|---|
| 1 | 0 | 1 | 0 | 0 |
| 1 | 1 | 0 | 1 | 1 |
| 0 | 1 | 1 | 0 | 0 |
| 0 | 0 | 1 | 1 | 1 |
| 1 | 0 | 0 | 1 | 1 |

Translation

A message may be selected for encryption using the natural language dependent stream cipher. The message may first be translated to a target language from the language of origin. The translation may be performed by hand or using an automated translation tool.

Encryption

After translating the message, a stream cipher implementation method may be applied to simulate the language dependent stream cipher. A parallel key may be generated. A parallel key stream (P.K.S.) may be defined based upon the translated text (T.T.) and a Unicode representation of the translated text in hexadecimal form. The following is a mathematical representation:

For m=1 to p

Input Z

Lang[m]=Z[m]

BLang[n]=Binary (Lang[n]).

Z is the integer of two bytes for storing the value of Arabic Unicode. Arabic is used only for exemplary purposes, and other languages may be used. Where Lang[m] is the array for storing all Arabic Unicode, AlphabetBinary( ) is a self-constructed function for converting hexadecimal Unicode to Binary. Alternatively, a built-in function may be used for binary conversion. Lang[n] is the array of binary numbers in which all Unicode in hexadecimal are converted to Binary. BLang[n] is the parallel key stream (P.K.S.). Therefore, to obtain a "super key" stream (S.K.S.), the O.K.S. and the P.K.S. are combined with an XOR operation as follows:

Super key Stream (S.K.S.)=(O.K.S.) XOR (P.K.S.)

The encryption process is continued after determining the S.K.S. An XOR operation is performed between the T.T. and the S.K.S. to create a cipher text (C.T.). The following is a mathematical representation:

Cipher Text (C.T.)=(T.T.) XOR (S.K.S.)

Encryption Example

The following is an example of a natural language dependent stream cipher encryption. The example is not meant to be limiting and is merely for illustrative purposes.

This example begins with a phrase that may be encrypted with a natural language dependent stream cipher. The original phrase is referred to as plain text (P.T.). For example, the original phrase may be:

Plain Text (P.T.)="ATTACK NOW"

The phrase then may be translated from the language of origin, here English, to a target language, here Arabic. Below is the Arabic translation of the P.T.: اهجم الآن

The P.T. may be translated from the language of origin to the target language through a language translator. Language translators are generally known in the art, and any language translator may be used to translate the P.T. from the language of origin to the target language. Translation may be manual or automated.

The translated phrase then may be converted into Unicode or other similar systems letter by letter, or symbol by symbol in the case of character-based languages. Unicode conversions for letters or symbols may be found in reference books, the Internet, and in other sources.

The following are Unicode representations of the letters from the translated phrase in Hexadecimal, Decimal, and Binary.

65165=ا=FE8D=1111111010001101
65259=ه=FEEB=1111111011101011
65183=ج=FE9F=1111111010011111
65250=م=FEE2=1111111011100010

65165=ا=FE8D=1111111010001101
65247=ل=FEDF=1111111011011111
65166=ا=FE8E=1111111010001110
65253=ن=FEE5=1111111011100101

Therefore, the Unicode representation of the translated phrase would be:

Translated Text (T.T)=11111110100011011111111-
10111010111111111010011111111111101110
00101111111010001101111111101
10111111111111010001110111111111011100101

The T.T. then may be used as an input sequence for encryption. A key stream generation process may be used. A LFSR may be used in the encryption process. A relation (R) for the LFSR may be defined as $R=<4, 1+D+D4>$.

An initial condition (I.C.) of the LFSR, which is a secret key (I.C.)=1010, may be used for the key stream generation. The generated Original Key Stream (O.K.S.) may become:

Original Key Stream (O.K.S)=01011001000011110

A parallel key stream is created using natural language. In this particular example, the Arabic language is used; therefore, the following is used to create the parallel key stream: عربي

The following is a translation into a Unicode representation:

ع =FECB=65227=1111111011001011
ر =FEAE=65198=1111111010101110
ب =FE91=65169=1111111010010001
ي =FEF2=65266=1111111011110010

Therefore, a parallel key stream (P.K.S.), which is secret between parties, is:

Parallel Key Stream (P.K.S.)=11111110110010111111-1110101011101111111010010001111111101111 00100101100100011110

The P.K.S. may be repeatedly used or a part can be used unless and/or until the O.K.S. ends. Next, an XOR operation is applied to the O.K.S. and the P.K.S. to increase the complexity of the key stream that results, which is referred to as a Super Key Stream (S.K.S.). Therefore, the S.K.S. becomes:

Super Key Stream (S.K.S)=(O.K.S) XOR (P.K.S)
Super Key Stream (S.K.S)=1010011111010101

As can be seen, the S.K.S. has a distinct value when compared to the O.K.S. This added layer of complexity increases the difficulty needed to break the encryption. Next, an XOR operation is applied to the T.T. and the S.K.S. to create a Cipher Text (C.T.).

Cipher Text (C.T.)=(T.T) XOR (S.K.S)
Cipher Text (C.T.)=01011001010110000101100001011-00100111110010110010100101001010100 1101011011000100100110101100010111010010 00100100101101100 0101001111.

The C.T. represents the encryption of the original P.T. The P.T. has been modified though use of natural language dependent stream ciphers. This example has used translation into Arabic, but other languages may be used. To further increase the complexity of the natural language dependent stream cipher, more than one language can be used to further encrypt the resulting C.T. The above process may be repeated as many times as desired to add further levels of complexity.

Decryption

Decryption may be performed as a reverse process of that described above. The C.T. is received from a sender, and the P.T. must be obtained from the received C.T. For decryption, the receiving party may use the relation (R) and the initial condition (I.C.) to generate the original key stream (O.K.S.). The S.K.S. then is generated by performing an XOR operation on the O.K.S. and the P.K.S. The process of obtaining the S.K.S. for decryption is the same as for encryption, but the mathematical order for the XOR operation is reversed, i.e., (T.T.)=(C.T.) XOR (S.K.S.).

Performing an XOR operation on the S.K.S. and the C.T. provides the translated text (T.T.). The T.T. then may be translated back to the language of origin using a translator. Preferably, the translator is commonly agreed upon by the sending party and the receiving party to reduce translation variations.

Decryption Example

The following is an example of a natural language dependent stream cipher decryption. The example is not meant to be limiting and is merely for illustrative purposes. For the sack of simplicity, the values of the O.K.S., the P.K.S., and the S.K.S. are used from the encryption example above because the same procedures are applied by the decryption system on the receiving end of a C.T. Therefore:

Original Key Stream (O.K.S.)=01011001000011110
Parallel Key Stream (P.K.S.)=11111110110010111-1111110101011101111111010010001111111101111 00100101100100011110
Super Key Stream (S.K.S.)=1010011111010101
Cipher Text (C.T.)=010110010101100001011001-00111110010110010100101001010100 0101101100010010011010110001011101001011100- 0100100101101100010 01001111

The translated text (T.T.) is given by:
Translated Text (T.T.)=(C.T.) XOR (S.K.S.)
Translated Text (T.T.)=111111101000110111111-11011101011111111101001111111111101110 001011111101000110111111111101101111111111-110100011101111110 11100101.

Comparing the T.T. for the decryption example, please note that it exactly matches the T.T. from the encryption example.

The decryption T.T. then is divided into 16-bit chunks. The 16-bit chunks then are converted from Unicode representations into a corresponding alphabet using standard conversion programs or tables. The result is:

65165=ا=FE8D=1111111010001101
65259=م=FEEB=1111111011101011
65183=ج=FE9F=1111111010011111
65250=ء=FEE2=1111111011100010
65165=ا=FE8D=1111111010001101
65247=ل=FEDF=1111111011011111
65166=ب=FE8E=1111111010001110
65253=ن=FEE5=1111111011100101

The letters then may be combined to create the original phrase. The combination of letters may be performed by hand or using an intelligent translator. Based upon the combining, the deciphered phrase is shown as: اهم الآن

The deciphered phrase then may be translated to the language of origin using translation services. The resulting exact match between the original translated phrase and the deciphered phrase illustrates that the natural language dependent stream cipher obeys the rule of unique decipherability that is the essence of cryptography.

Using Natural Language Stream Ciphers as One-Time Pad (OTP) Stream Ciphers

Natural language dependent stream ciphers may be used as one-time pad (OTP) stream ciphers. Generally, an OTP uses a key stream of completely random digits. The key stream is combined with the plain text digits one at a time to form a cipher text. The natural language dependent stream cipher may be used as an OTP by using different languages each time instead of repeatedly using a single language, such as Arabic in the above examples. For example, the first use of the natural language dependent stream cipher may use Arabic, the second use may use Chinese, the third use may use French, etc. There is an understanding between the sending party and the receiving party of the sequence of usage of languages.

An Exemplary System

Figure 4:
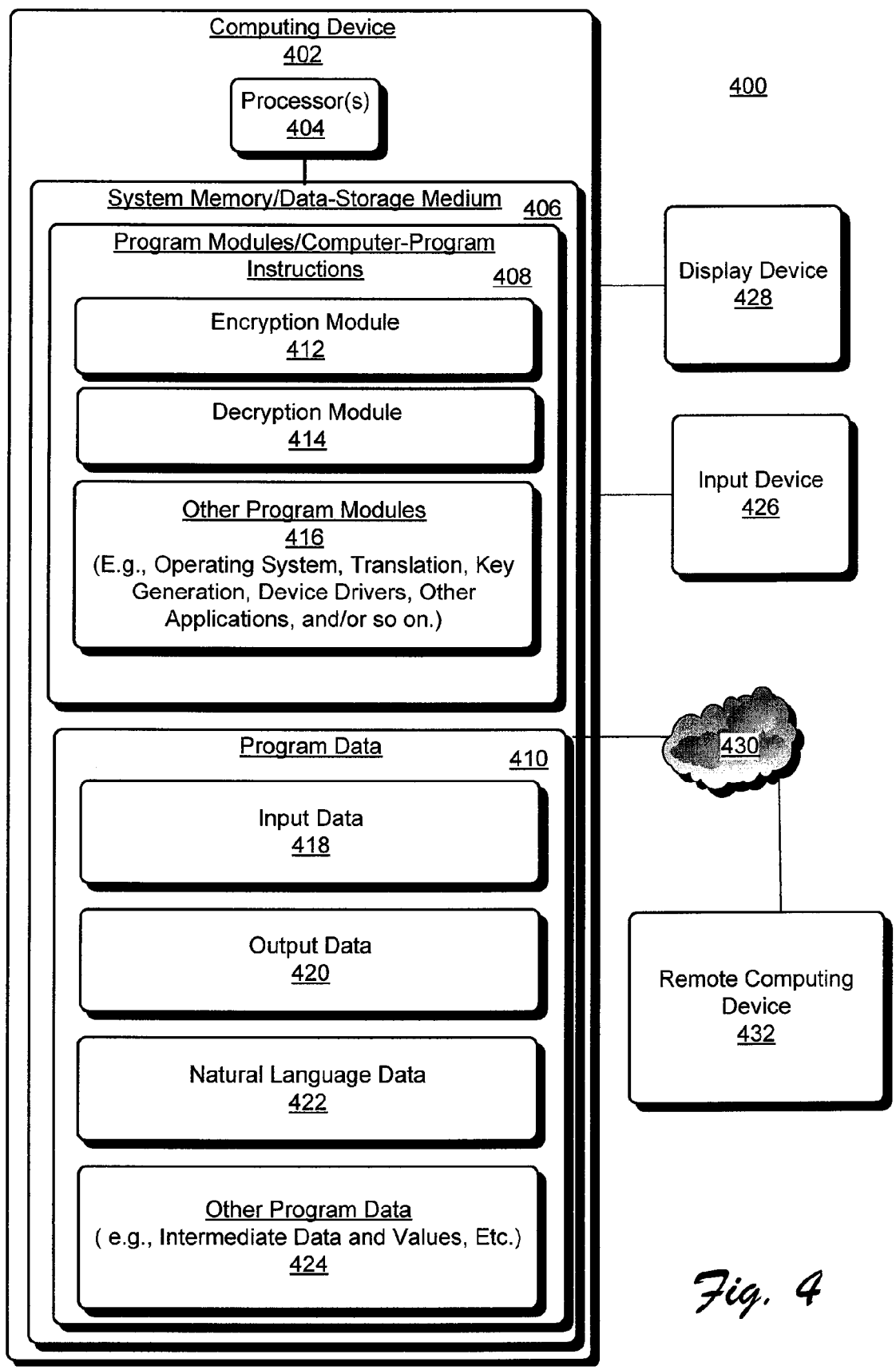
FIG. 4 shows an exemplary system for implementing natural language dependent stream ciphers, according to one embodiment.

FIG. 4 illustrates an exemplary system 400 for implementing natural language dependent stream ciphers, according to one embodiment. In this embodiment, a computing device 402 may have one or more processors 404, a tangible system memory 406, program modules/computer-program instructions 408, and/or program data/data storage mediums 410. The computer-program instructions 408 may include an encryption module 412 to operate the encryption process, a decryption module 414 to operate the decryption process, and/or other program modules 416. The other program modules may include an operating system, translation programs, key generation processes, device drivers, and other applications.

In one exemplary implementation, program data/data storage medium 410 may include input data 418, output data 420, natural language data 422, and/or other program data 424. The input data 418 may be received from an input device 426 and stored in the data storage medium 410. Information may be output and/or displayed on a display device 428. The output data 420 may be sent over a network 430 to a remote computing device 432. Alternatively, input data 418 may be received over the network 430 from the remote computing device 432. The natural language data 422 may include one or more databases of language information used in translation modules. Other program data 424 may include any intermediate data and/or values used by the computer-program instructions 408.

CONCLUSION

Although the above sections describe natural language dependent stream ciphers in language specific to structural features and/or methodological operations or actions, the implementations defined in the appended claims are not necessarily limited to the specific features or actions described. Rather, the specific features and operations for natural language dependent stream ciphers are disclosed as exemplary forms of implementing the claimed subject matter.

The invention claimed is:

1. A method implemented at least in part by a computing device for natural language dependent stream ciphers, the method comprising:
   receiving an input in a first natural language;
   generating encrypted output comprising a natural language dependent stream cipher from the input in the first natural language, the generating comprising:
   translating the input in the first natural language to an input in a second natural language; and
   wherein the first and the second natural languages are not a same natural language, and wherein each of the first and second natural languages is a particular language spoken by human beings for normal communications:
   performing an XOR operation on the binary Unicode representation of the input in the second natural language and a binary key to generate an encrypted output;
   outputting the encrypted output to a computing device for access by a viewer capable of decrypting the encrypted output.

2. The method of claim 1 wherein the second natural language is selected automatically.

3. The method of claim 1, wherein generating the natural language dependent stream cipher further comprises:
   generating a binary Unicode representation of the input in the second natural language; and
   performing an XOR operation on the binary Unicode representation of the input in the second natural language and a binary key.

4. The method of claim 3 wherein the binary key is a binary Unicode representation of a text string unrelated to the input in the first natural language.

5. The method of claim 3 wherein the binary key is generated at least in part by:
   receiving a selection of a stream cipher;
   receiving an initial condition;
   receiving a relation;
   performing an XOR operation on the initial condition and the relation to generate an original key stream;
   generating a parallel key stream; and
   performing an XOR operation on the original key stream and the parallel key stream.

6. The method of claim 5 wherein the parallel key stream is generated from a binary Unicode representation of a text string unrelated to the input in the first natural language.

7. The method of claim 5 wherein the stream cipher is selected from one or more of linear feedback shift register, alternating step generation, clock controlled generation algorithm, and/or combinations thereof.

8. The method of claim 1 further comprising decrypting the encrypted output.

9. The method of claim 8 wherein decrypting the encrypted output comprises:
   receiving the encrypted output;
   generating the binary key;
   performing an XOR operation on the encrypted output and the binary key to generate the input in the second natural language as a binary Unicode representation;
   converting the input in the second natural language in the binary Unicode representation to the input in the second natural language;
   translating the input in the second natural language to the input in the first natural language; and
   outputting the input in the first natural language for viewing by an end-user.

10. The method of claim 9 wherein converting the input in the second natural language in the binary Unicode representation to the input in the second natural language comprises:
    dividing the input in the second natural language in the binary Unicode representation into one or more 16 bit chunks;
    converting each of the one or more 16 bit chunks into an individual symbol representation in the second natural language; and
    combining the individual symbol representations in the second natural language to form the input in the second natural language.

11. The method of claim 1 further comprising translating the encrypted output into a subsequent language and repeating the natural language dependent stream cipher method one or more times.

12. A non-transitory computer-readable data storage medium for performing a natural language dependent stream cipher method, the tangible computer-readable data storage medium comprising computer-program instructions executable by a processor, the computer-program instructions when executed by the processor for performing operations comprising:
    receiving an input in a first natural language;
    translating the input in the first natural language to an input in a second natural language, and wherein each of the first and second natural languages is a particular language spoken by human beings for normal communications;
    generating a binary Unicode representation of the input in the second natural language;
    performing an XOR operation on the binary Unicode representation of the input in the second natural language and a binary key to generate an encrypted output; and
    outputting the encrypted output.

13. The tangible computer-readable data storage medium of claim 12 wherein the binary key is generated by the method comprising:
    receiving a selection of a stream cipher;
    receiving an initial condition;
    receiving a relation;
    performing an XOR operation on the initial condition and the relation to generate an original key stream;
    generating a parallel key stream; and
    performing an XOR operation on the original key stream and the parallel key stream.

14. The tangible computer-readable data storage medium of claim 13 further comprising decrypting the cipher text.

15. The tangible computer-readable data storage medium of claim 14 wherein the decrypting further comprises:
- receiving the encrypted output;
- generating the binary key;
- performing an XOR operation on the encrypted output and the binary key to generate the input in the second natural language as a binary Unicode representation;
- converting the input in the second natural language in the binary Unicode representation to the input in the second natural language;
- translating the input in the second natural language to the input in the first natural language; and
- outputting the input in the first natural language.

16. The tangible computer-readable data storage medium of claim 15 wherein the converting the input in the second natural language in the binary Unicode representation to the input in the second natural language comprises:
- dividing the input in the second natural language in the binary Unicode representation into one or more 16 bit chunks;
- converting each of the one or more 16 bit chunks into an individual symbol representation in the second natural language; and
- combining the individual symbol representations in the second natural language to form the input in the second natural language.

17. An apparatus for performing a natural language dependent stream cipher method, the apparatus comprising:
- a processor; and
- a memory coupled to the processor, the memory comprising computer-program instructions executable by the processor, the computer-program instructions when executed by the processor for performing operations comprising:
- receiving an input in a first natural language;
- translating the input in the first natural language to an input in a second natural language, and wherein each of the first and second natural languages is a particular language spoken by human beings for normal communications;
- generating a binary Unicode representation of the input in the second natural language;
- performing an XOR operation on the binary Unicode representation of the input in the second natural language and a binary key to generate an encrypted output; and
- outputting the encrypted output.

18. The apparatus of claim 17 wherein the binary key is generated by the method comprising:
- receiving a selection of a stream cipher;
- receiving an initial condition;
- receiving a relation;
- performing an XOR operation on the initial condition and the relation to generate an original key stream;
- generating a parallel key stream; and
- performing an XOR operation on the original key stream and the parallel key stream.

19. The apparatus of claim 17 further comprising decrypting the cipher text.

20. The apparatus of claim 19 wherein the decrypting further comprises:
- receiving the encrypted output;
- generating the binary key;
- performing an XOR operation on the encrypted output and the binary key to generate the input in the second natural language as a binary Unicode representation;
- converting the input in the second natural language in the binary Unicode representation to the input in the second natural language;
- translating the input in the second natural language to the input in the first natural language; and
- outputting the input in the first natural language.

21. The apparatus of claim 20 wherein the converting the input in the second natural language in the binary Unicode representation to the input in the second natural language comprises:
- dividing the input in the second natural language in the binary Unicode representation into one or more 16 bit chunks;
- converting each of the one or more 16 bit chunks into an individual symbol representation in the second natural language; and
- combining the individual symbol representations in the second natural language to form the input in the second natural language.

* * * * *